United States Patent
Zhang et al.

(10) Patent No.: US 11,864,219 B2
(45) Date of Patent: Jan. 2, 2024

(54) PER UE PRIORITY DEFINITION FOR MULTI-UE SCHEDULING CONFLICT HANDLING

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/450,678

(22) Filed: Oct. 12, 2021

(65) Prior Publication Data
US 2023/0116005 A1    Apr. 13, 2023

(51) Int. Cl.
H04W 72/08    (2009.01)
H04L 5/14    (2006.01)
H04W 72/541    (2023.01)

(52) U.S. Cl.
CPC ............. *H04W 72/541* (2023.01); *H04L 5/14* (2013.01)

(58) Field of Classification Search
CPC ............................... H04W 72/541; H04L 5/14
See application file for complete search history.

(56) References Cited

U.S. PATENT DOCUMENTS

| | | | | |
|---|---|---|---|---|
| 2018/0115964 A1* | 4/2018 | Lin | ........................ | H04W 72/23 |
| 2020/0022017 A1* | 1/2020 | Raghavan | ............. | H04W 24/08 |
| 2020/0296701 A1* | 9/2020 | Park | ........................ | H04W 72/56 |
| 2020/0322944 A1* | 10/2020 | Soriaga | .................. | H04W 72/51 |
| 2021/0176752 A1* | 6/2021 | Yang | ........................ | H04L 5/0044 |
| 2021/0360642 A1* | 11/2021 | Abedini | ................. | H04W 72/56 |
| 2021/0410155 A1* | 12/2021 | Khoshnevisan | ....... | H04L 1/1854 |
| 2021/0410175 A1* | 12/2021 | Xue | ........................ | H04W 76/25 |
| 2022/0232545 A1* | 7/2022 | Mukherjee | ............. | H04L 5/0053 |
| 2022/0240256 A1* | 7/2022 | Balasubramanian | ......................... | H04W 52/243 |

FOREIGN PATENT DOCUMENTS

EP    3764725 A1    1/2021
WO    2020249229 A1    12/2020

OTHER PUBLICATIONS

International Search Report and Written Opinion—PCT/US2022/045552—ISA/EPO—dated Jan. 3, 2023.

* cited by examiner

*Primary Examiner* — Bailor C Hsu
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for handling multi-UE scheduling conflicts. A first UE may receive group common DCI that schedules each of a plurality of UEs including the first UE for an uplink transmission or a downlink reception. The group common DCI may include per UE priority indications for each of the plurality of UEs. The first UE may resolve a conflict between first resources scheduled for the first UE that overlap in time with second resources scheduled for a second UE of the plurality of UEs. Resolving the conflict may include reducing self-interference associated with a full-duplex communication based on the per UE priority indications included in the group common DCI.

20 Claims, 14 Drawing Sheets

1000

1002
Receive group common DCI that schedules each of a plurality of UEs including the first UE for an uplink transmission or a downlink reception—the group common DCI includes per UE priority indications for each of the plurality of UEs 1004
Resolve a conflict between first resources scheduled for the first UE that overlap in time with second resources scheduled for a second UE of the plurality of UEs—resolving the conflict includes reducing self-interference associated with a full-duplex communication based on the per UE priority indications included in the group common DCI.

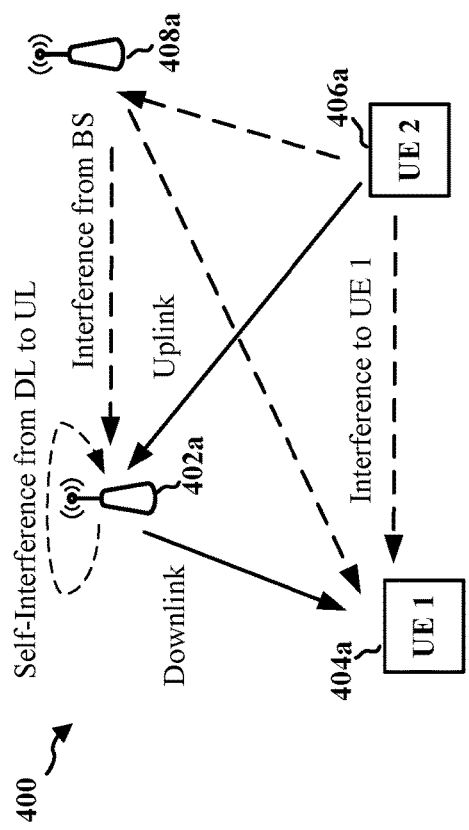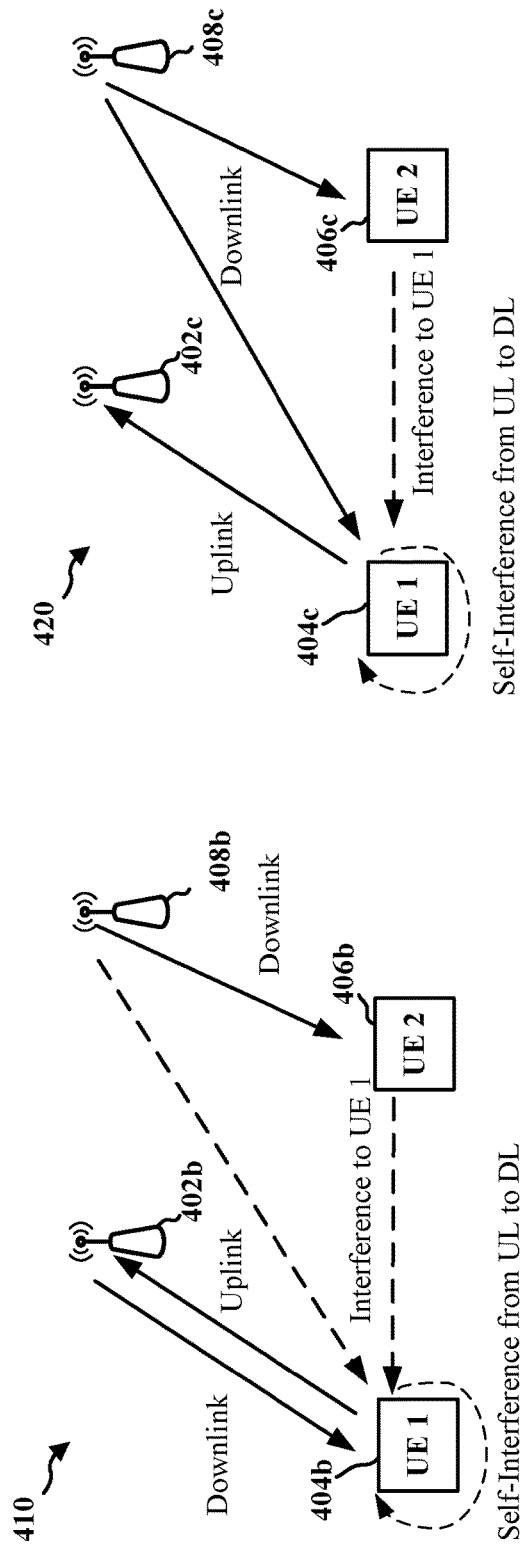
FIG. 4A
FIG. 4B
FIG. 4C

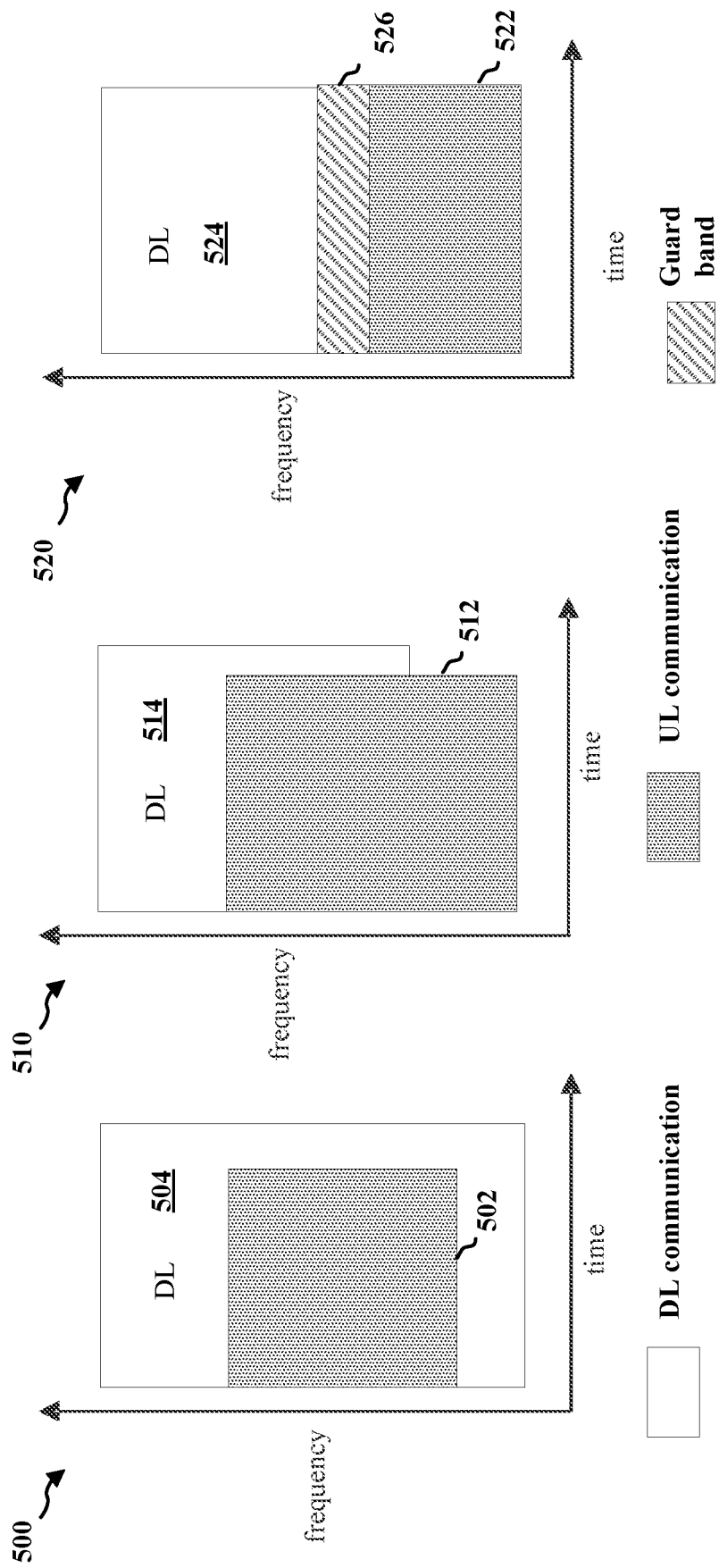

PER UE PRIORITY DEFINITION FOR MULTI-UE SCHEDULING CONFLICT HANDLING

TECHNICAL FIELD

The present disclosure relates generally to communication systems, and more particularly, to the handling of multi-user equipment (UE) scheduling conflicts.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive group common downlink control information (DCI) that schedules each of a plurality of user equipments (UEs) including a first UE for an uplink transmission or a downlink reception, the group common DCI including per UE priority indications for each of the plurality of UEs; and resolve a conflict between first resources scheduled for the first UE that overlap in time with second resources scheduled for a second UE of the plurality of UEs, wherein resolving the conflict includes reducing self-interference associated with a full-duplex communication based on the per UE priority indications included in the group common DCI.

In another aspect of the disclosure, a method, a computer-readable medium, and an apparatus are provided. The apparatus may transmit group common DCI that schedules each of a plurality of UEs for an uplink transmission or a downlink reception associated with a full-duplex communication; and indicate, in the group common DCI, a per UE priority indication for each of the plurality of UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A, 4B, and 4C illustrate exemplary modes of full-duplex communication.

FIGS. 5A and 5B illustrate examples of resources that are in-band full duplex (IUD).

FIG. 5C illustrates an example of resources for sub-band full-duplex communication.

DETAILED DESCRIPTION

Figure 1:
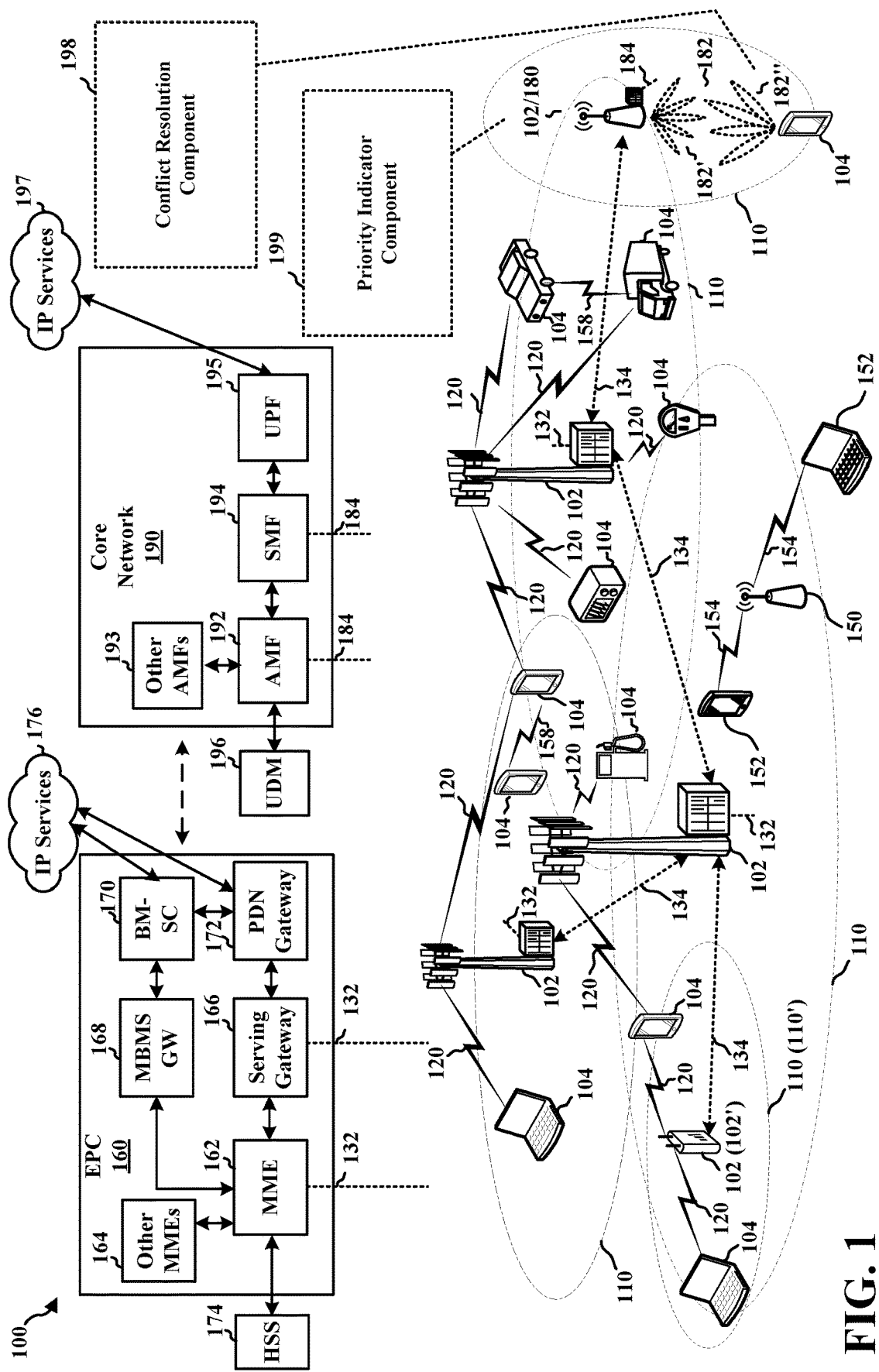
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a conflict resolution component 198 configured to receive group common downlink control information (DCI) that schedules each of a plurality of UEs including the first UE for an uplink transmission or a downlink reception, the group common DCI including per UE priority indications for each of the plurality of UEs; and resolve a conflict between first resources scheduled for the first UE that overlap in time with second resources scheduled for a second UE of the plurality of UEs, wherein resolving the conflict includes reducing self-interference associated with a full-duplex communication based on the per UE priority indications included in the group common DCI. In certain aspects, the base station 180 may include a priority indicator component 199 configured to transmit group common DCI that schedules each of a plurality of UEs for an uplink transmission or a downlink reception associated with a full-duplex communication; and indicate, in the group common DCI, a per UE priority indication for each of the plurality of UEs. Although the following description may be focused on 5G NR, the concepts described herein may be applicable to other similar areas, such as LTE, LTE-A, CDMA, GSM, and other wireless technologies.

Figure 2:
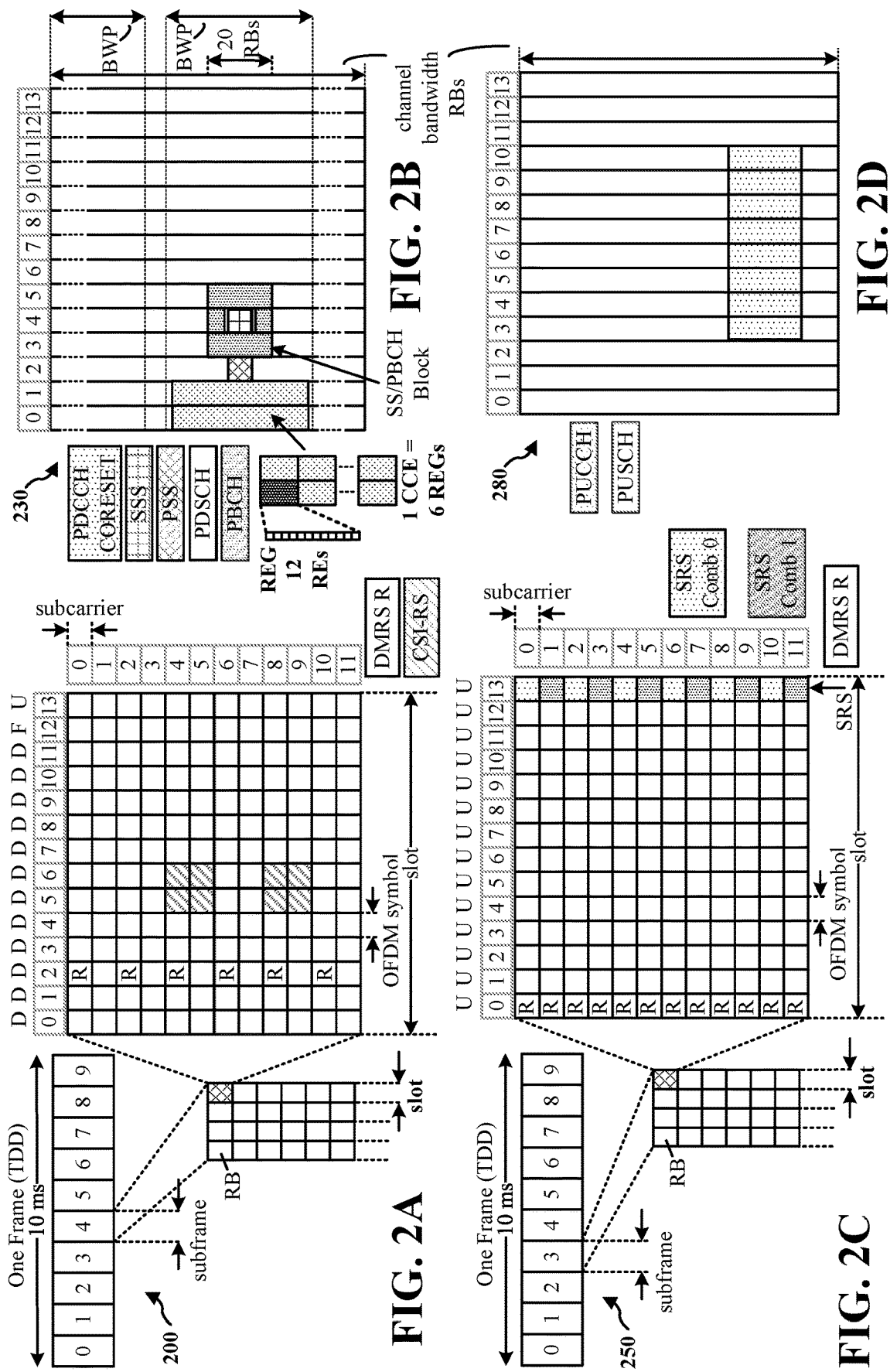
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
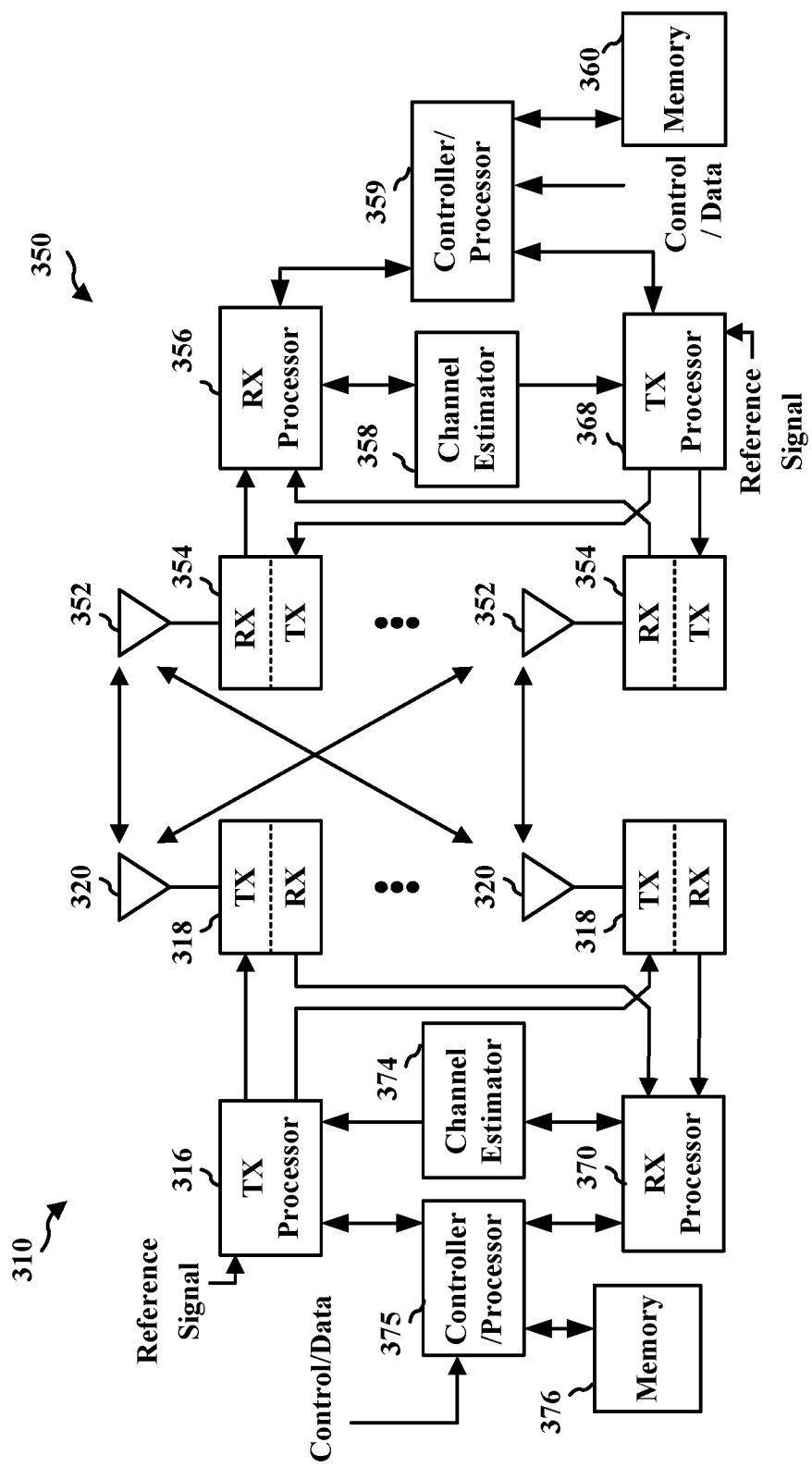
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the conflict resolution component 198 of FIG. 1.

At least one of the TX processor 316, the RX processor 370, and the controller/processor 375 may be configured to perform aspects in connection with the priority indicator component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband technologies remain useful to continue the progression of such technologies.

FIGS. 4A-4C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 4A shows a first example of full-duplex communication 400 in which a first base station 402a is in full duplex communication with a first UE 404a and a second UE 406a. Full duplex communication refers to transmission and reception that overlaps in time. The first base station 402a is a full-duplex base station, whereas the first UE 404a and the second UE 406a may be configured as either a half-duplex UE or a full-duplex UE. The second UE 406a may transmit a first uplink signal to the first base station 402a as well as to other base stations, such as a second base station 408a in proximity to the second UE 406a. The first base station 402a transmits a downlink signal to the first UE 404a concurrently with receiving the uplink signal from the second UE 406a. The base station 402a may experience self-interference from the receiving antenna that is receiving the uplink signal from UE 406a while also receiving some of the downlink signal being transmitted to the UE 404a. The base station 402a may experience additional interference due to signals from the second base station 408a. Interference may also occur for reception at the first UE 404a based on signals from the second base station 408a as well as from uplink signals from the second UE 406a.

FIG. 4B shows a second example of full-duplex communication 410 in which a first base station 402b is in full-duplex communication with a first UE 404b. In this example, the first base station 402b is a full-duplex base station and the first UE 404b is a full-duplex UE. A full-duplex base station is a base station that transmits and receives signals that overlap in time and within a same frequency range. A full-duplex UE is a UE that transmits and receives signals that overlap in time and within a same frequency range. For example, in FIG. 4B, the first base station 402b and the UE 404b may concurrently receive and transmit communication that overlaps in time in a same frequency band. The base station and the UE may each experience self-interference, in which a device's transmitted signal leaks to (e.g., is received by) a receiver at the same device. The first UE 404b may experience additional interference based on one or more signals emitted from a second UE 406b and/or a second base station 408b in proximity to the first UE 404b.

FIG. 4C shows a third example of full-duplex communication 420 in which a first UE 404c is a full-duplex UE in communication with a first base station 402c and a second base station 408c. The first base station 402c and the second base station 408c may serve as multiple transmission and reception points (multi-TRPs) for uplink and downlink communication with the UE 404c. The second base station 408c may be in communication with a second UE 406c. In FIG. 4C, the first UE 404c may concurrently transmit an uplink signal to the first base station 402c while receiving a downlink signal from the second base station 408c. The first UE 404c may experience self-interference as a result of the first signal and the second signal being communicated simultaneously, e.g., the uplink signal may leak to (e.g., be received by) the UE's receiver. The first UE 404c may experience additional interference from the second UE 406c.

FIGS. 5A-5B illustrate a first example 500 and a second example 510 of IBFD resources. FIG. 5C illustrates an example 520 of sub-band full-duplex resources. In IBFD, signals may be transmitted and received in overlapping times and overlapping in frequency. As shown in the first example 500, a time and a frequency allocation of uplink resources 502 may fully overlap with a time and a frequency allocation of downlink resources 504. In the second example 510, a time and a frequency allocation of uplink resources 512 may partially overlap with a time and a frequency of allocation of downlink resources 514.

IBFD is in contrast to sub-band FDD, where uplink and downlink resources may overlap in time using different frequencies, as shown in FIG. 5C. As shown in FIG. 5C, the uplink resources 522 are separated from the downlink resources 524 by a guard band 526. The guard band may be frequency resources, or a gap in frequency resources, provided between the uplink resources 522 and the downlink resources 524. Separating the uplink frequency resources and the downlink frequency resources with a guard band may help to reduce self-interference. In some examples, a guard band might not be provided between the separate uplink resources and downlink resources. For example, uplink resources and downlink resources that are immediately adjacent may be considered to have a guard band width of 0. As an output signal, e.g., from a UE transmitter, may extend outside the uplink resources, the guard band may reduce interference experienced by the UE. Sub-band FDD may also be referred to as "flexible duplex".

Figure 6:
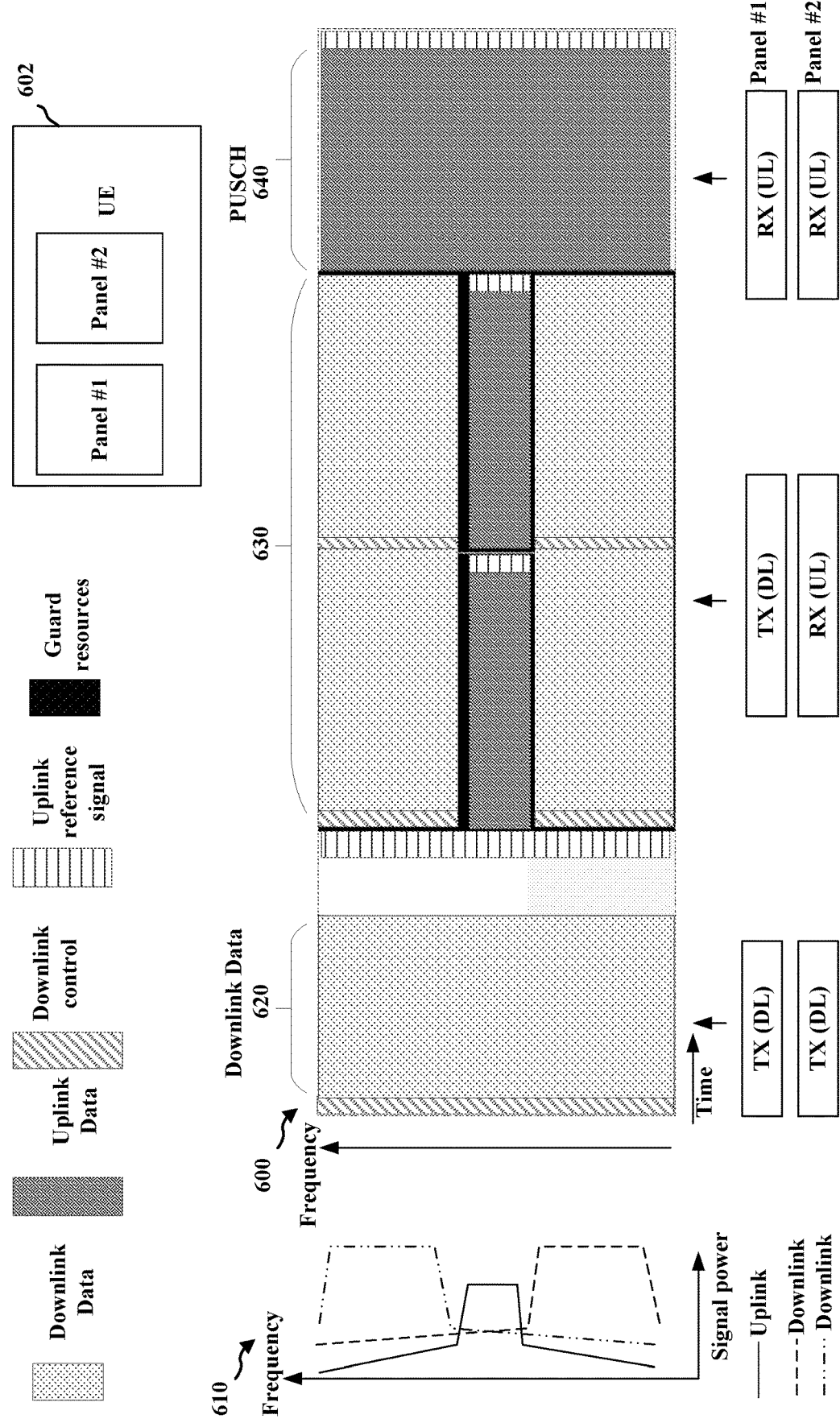
FIG. 6 is an example of time and frequency resources including full-duplex resources.

Aspects presented herein help to provide self-interference mitigation. Aspects may help to improve isolation, such as enabling isolation greater than 50 dB. FIG. 6 illustrates an example device 602 that includes separate panels, e.g., antenna panels, for simultaneous transmission and reception in full-duplex operation. For example, the device 602 is illustrated as including panel #1 and panel #2. In some examples, panel #1 may be for downlink transmission. The downlink transmission may be at both edges of a frequency band, such as illustrated in 600 and 610. Panel #2 may be for uplink reception, such as using frequency resources within a frequency band, such as at a middle of the frequency band. Sub-band full duplex operation, such as described in connection with FIG. 5C may be associated with an isolation of greater than 40 dB. As shown in FIG. 5C, the downlink and uplink resources may be in different portions of a frequency band with a guard band between the uplink and downlink portions of the frequency band. FIG. 6 illustrates an example set of time and frequency resources 600 that include both half duplex and full duplex periods. For example, the period of time 620 includes half duplex resources for downlink data, e.g., panel #1 and panel #2 may both receive downlink data during the period of time 620. The period of time 620 includes sub-band full-duplex resources for uplink transmissions (e.g., PUSCH) and downlink reception (e.g., downlink data), e.g., panel #1 may receive downlink data and panel #2 may transmit PUSCH during the period of time 630. The period of time 640 includes half duplex resources for uplink data, e.g., panel #1 and panel #2 may both transmit PUSCH during the period of time 640. FIG. 6 also includes a graph 610 showing a signal power over frequency that shows that uplink and downlink signals leak outside of the frequency range provided in the sub-band full-duplex resources of period of time 630.

A slot format may be referred to as a "D+U" slot when the slot has a frequency band that is used for both uplink and downlink transmissions. The downlink and uplink transmissions may occur in overlapping frequency resources, such as shown in FIGS. 5A and 5B (e.g., in-band full duplex resources) or may occur in adjacent or slightly separated frequency resources, such as shown in FIG. 5C (e.g., sub-band full duplex resources). In a particular D+U symbol, a half-duplex device may either transmit in the uplink band or receive in the downlink band. In a particular D+U symbol, a full-duplex device may transmit in the uplink band and receive in the downlink band, e.g., in the same symbol or in the same slot. A D+U slot may include downlink only symbols, uplink only symbols, and full-duplex symbols. For example, in FIG. 6, the period of time 620 may extend for one or more symbols (e.g., downlink only symbols), the period of time 640 may extend for one or more symbols (e.g., uplink only symbols), and the period of time 630 may extend for one or more symbols (e.g., full-duplex symbols or D+U symbols).

In some examples, the receiver may perform windowed overlap and add (WOLA) to reduce the adjacent channel leakage ratio (ACLR) for the leakage of the uplink signal. An analog low pass filter (LPF) may improve an analog-to-digital conversion (ADC) dynamic range. The receiver automatic gain control (AGC) states may be improved in order to improve the noise figure (NF). Digital interference cancelation of the ACLR leakage, e.g., greater than 20 dB, may be used. In some examples, a non-linear model may be employed for each Tx-Rx pair.

In some examples, uplink power control may be used to mitigate self-interference. For example, a full-duplex UE may reduce the uplink transmission power, which will reduce the interference caused to downlink reception in full-duplex slots through uplink power control. Similarly, a full-duplex base station may reduce the downlink transmission power to reduce the interference caused to uplink reception in full-duplex slots through downlink power control. In some examples, different uplink power control parameters may be applied for a full-duplex slot that are different than for a half-duplex slot. In some examples, sub-band power control parameters, such as uplink power control offset or scaling, may be applied for full-duplex operation and may be different than parameters applied for half-duplex operation.

Figure 7:
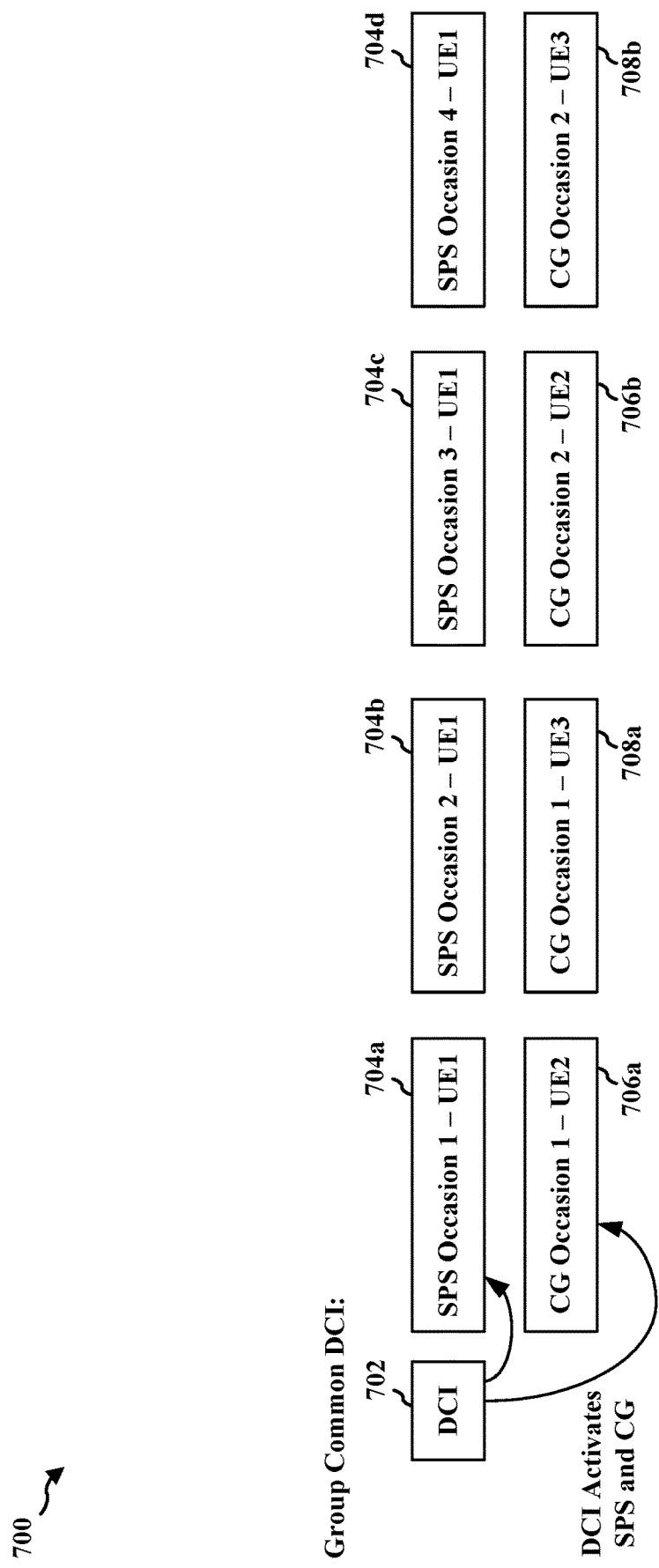
FIG. 7 illustrates a diagram of group common downlink control information (DCI) that schedules multiple semi-persistent scheduling (SPS)/configured grant (CG) occasions for multiple UEs.

FIG. 7 illustrates a diagram 700 of group common DCI 702 that schedules multiple semi-persistent scheduling (SPS)/configured grant (CG) occasions for multiple UEs. Full-duplex capabilities may be included at a base station, a UE, or both. For instance, uplink transmissions may be performed via a first panel and downlink receptions may be performed via a second panel of a same device. Full-duplex capabilities may be based on beam separation, self-interference between the downlink reception and the uplink transmission, clutter/echo, etc. Full-duplex procedures may provide latency reduction. For example, the UE may receive a downlink signal in uplink slots, which may enable latency savings. Full-duplex procedures may also increase spectral efficiency (e.g., per UE and per cell) and provide a more efficient resource utilization. Full-duplex configurations may include one UE that communicates with a first TRP via downlink and with a second TRP via uplink; one base station that communicates with a first UE via downlink and with a second UE via uplink; and one base station that communicates with one UE via both downlink and uplink.

Multi-UE scheduling may be performed based on only the base station being in a full-duplex mode and the UE(s) being in a half-duplex mode. Multi-UE scheduling may be in contrast to per UE scheduling, where the scheduling may be performed on a per UE basis. Group common DCI 702 may be transmitted by a base station that operates in the full-duplex mode. For example, the base station may communicate with two different UEs at the same time over downlink and uplink channels. While the base station may operate in the full-duplex mode, the different UEs may be operate in the half-duplex mode. Thus, the base station may be connected to the first UE and the second UE for downlink and uplink communications in a first example, connected to the first UE and a third UE for downlink and uplink communications in a second example, etc. That is, two different UEs may be communicating with the base station during a same time slot via downlink and uplink, where the base station may operate in the full-duplex mode.

If the base station is operating in the full-duplex mode, the base station may schedule multiple SPS occasions 704*a*-704*d* and/or CG occasions 706*a*-706*b*/708*a*-708*b* for multiple UEs via a single RRC or DCI. In the diagram 700, a first UE may be associated with a first through fourth SPS occasion 704*a*-704*d*, a second UE may be associated with a first and second CG occasion 706*a*-706*b*, and a third UE may be associated with a different first and second CG occasion 708*a*-708*b*. The associations may be based on DCI, such as group common DCI 702, that activates the SPS occasions 704*a*-704*d* and the CG occasions 706*a*-706*b*/708*a*-708*b* for the first UE, the second UE, and the third UE. The SPS occasions 704*a*-704*d* and the CG occasions 706*a*-706*b*/708*a*-708*b* for the UEs may be overlapped in time at different time slots. For example, the SPS occasions 704*a* and 704*c* of the first UE may overlap in time with the CG occasions 706*a*-706*b* of the second UE at a first time slot and a third time slot, and other SPS occasions 704*b* and 704*d* of the first UE may overlap in time with the CG occasions 708*a*-708*b* of the third UE at a second time slot and a fourth time slot. That is, the base station may be performing full-duplex communications with the first UE and the second UE at the first time slot and the third time slot, and performing other full-duplex communications with the first UE and the third UE at the second time slot and the fourth time slot.

The first UE, the second UE, and the third UE may each be operating in a half-duplex mode, even though the base station may be operating in the full-duplex mode to communicate with two different UEs simultaneously. Group common DCI 702 used to schedule multiple SPS occasions 704*a*-704*d* and CG occasions 706*a*-706*b*/708*a*-708*b* may also inform each UE of the scheduling of the other UEs. For example, the first UE may determine from the group common DCI 702 when full-duplex communications are being performed with the second UE and when full-duplex communications are being performed with the third UE.

The group common DCI 702 may indicate, e.g., to second UE, the scheduling of the first UE, so that the second UE may determine time slots/durations that are overlapped with the first UE. Without the group common DCI 702, the scheduling may be based on pre-scheduling, such that the second UE may not be able to determine whether the base station is operating in the full-duplex mode with another UE. The second UE may simply determine that at time X the second UE will be receiving a downlink reception from the base station. Thus, scheduling indicated via the group common DCI 702 may be utilized so that each UE may determine the scheduling of the other UEs.

Overhead costs may be reduced by configuring the multiple SPS occasions 704a-704d and CG occasions 706a-706b/708a-708b via a single DCI. RRC/DCI may configure/activate multiple SPS and CG configurations for multiple UEs (e.g. via the group common DCI 702). If the first UE is able to determine whether communications are being transmitted in the uplink direction by another UE, the first UE may be able to select predefined parameters for performing the downlink reception simultaneously with the uplink transmission of the other UE. For example, if the base station is performing a full-duplex communication with the first UE and the second UE, a particular beam, such as beam 3, may be selected for the first UE as the beam to be used for communications between the base station and the first UE.

The base station may determine a beam pair for both the first UE and the second UE. In an example, beam 3 and beam 1 may be paired together for the first UE and the second UE for the base station to communicate with both UEs in the full-duplex mode, as beam 1 may be determined to cause decreased self-interference to beam 3 for receiving communications from the second UE. Similarly, if the base station is performing full-duplex communications with the first UE and the third UE, the base station may determine that beams 5 and 6 are to be paired together for performing the full-duplex communication with the first UE and the third UE, as beam 5 may be determined to cause decreased interference to beam 6. Thus, if the first UE is communicating the base station at the same time the second UE is communicating with the base station, the first UE may utilize beam 1—but if the third UE is scheduled to communicate with the base station at the same time as the first UE, the first UE may determine to adjust the communication beam to beam 5.

Communications of the first UE being overlapped in time with communications of the other UEs may be associated with a rule for adapting/switching parameters of the first UE across different occasions. The RRC/DCI configuration may predefine different sets of parameters for different occasions of the first UE to adapt/switch beams. For example, the first and third SPS occasions 704a and 704c of the first UE may be overlapped in time with the first and second CG occasions 706a-706b of the second UE. The first UE may adjust a communication beam with the base station to use beam 1 for the first and third SPS occasions 704a and 704c and to use beam 5 for the second and fourth SPS occasions 704b and 704d, which may be overlapped in time with different first and second CG occasions 708a and 708b of the third UE. Thus, the parameters of the first UE may be switched for different time durations based on whether communications of the first UE are overlapped in time with communications of the second UE or the third UE. If the beams are preconfigured, the first UE may adapt to different parameters based on the scheduling determined from the group common DCI 702.

Figure 8:
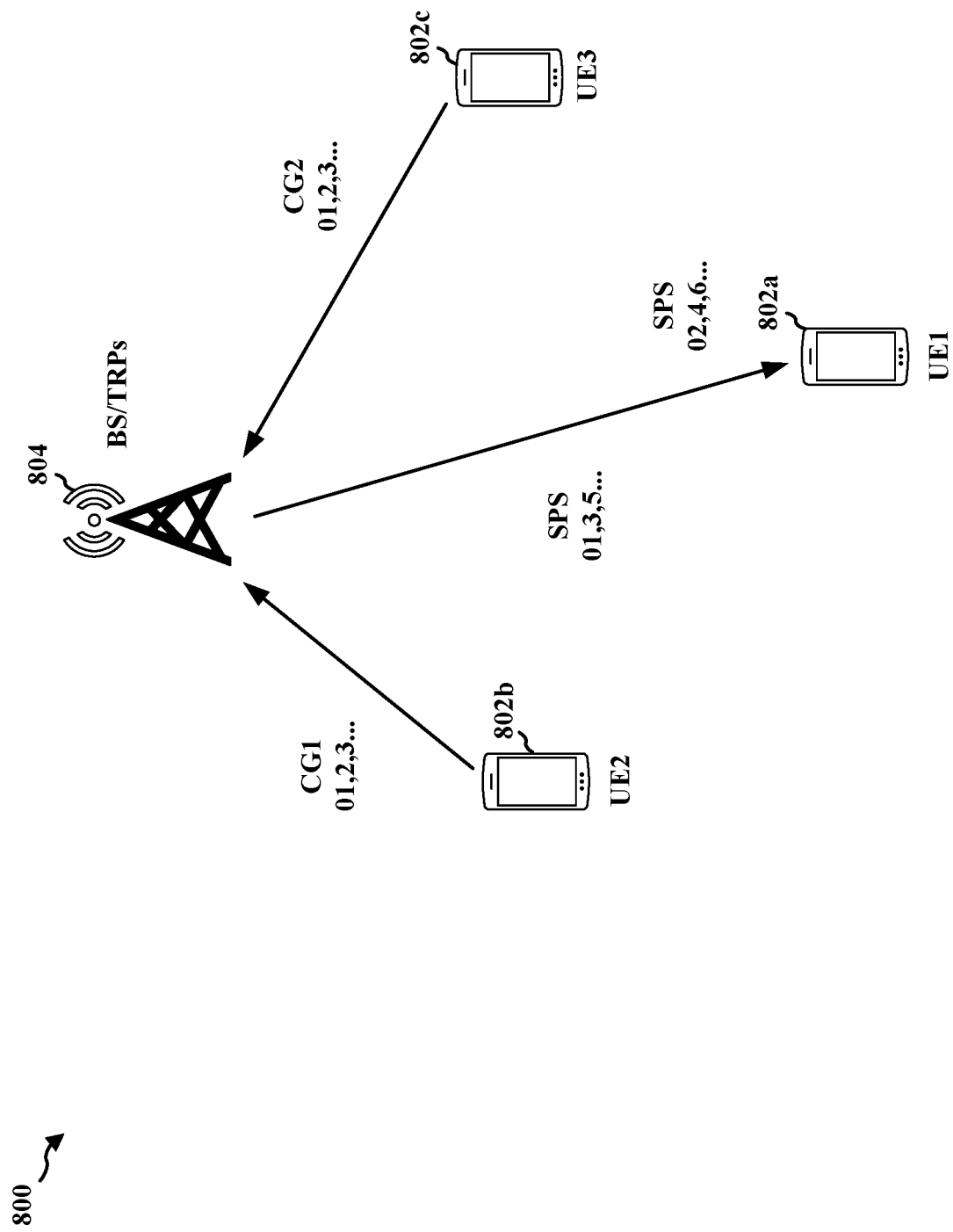
FIG. 8 is a diagram of a base station that communicates with multiple UEs in a full-duplex mode.

FIG. 8 is a diagram 800 of a base station 804 that communicates with multiple UEs 802a-802c in a full-duplex mode. Multi-UE scheduling may include uplink/downlink scheduling conflicts among a group of UEs over different time slots. If the group common DCI schedules multi-UE transmissions and receptions for a full-duplex base station 804, the group common DCI may include a per UE scheduling field. That is, each UE 802a-802c may be associated with a respective scheduling field in the group common DCI that schedules the multiple UEs 802-802c for transmissions and receptions. The scheduling field may indicate a UE identifier (ID). For example, UE ID 1 may be associated with scheduling field 1, which may indicate the time-frequency resources used for UE ID1, UE ID 2 may be associated with scheduling field 2, UE ID 3 may be associated with scheduling field 3, etc. Thus, each UE 802a-802c that receives the group common DCI may determine the scheduling of the other UEs and adjust their respective parameters based on the scheduling of the other UEs. Since the first UE 802a may decode the scheduling field of the second UE 802b included in the group common DCI, the first UE 802a may determine when the second UE 802b is going to communicate with the base station 804 and may adjust internal parameters of the first UE 802a accordingly. For instance, the first UE 802a may switch to a different beam based on the scheduling of the second UE 802b, adjust a modulation and coding scheme (MCS) precoder, etc., based on a configuration of the base station 804.

A priority level across multiple UEs may be determined in addition to, or alternatively to, an uplink priority level per uplink channel associated with the UEs 802a-802c. For example, the second UE 802b may transmit a PUCCH/PUSCH, where the priority of the PUCCH/PSUCH is indicative of which communication the second UE 802b transmits/multiplexes first. By determining a per UE priority, communications between the UEs 802a-802c and the base station 804 may be associated with a priority level that applies across multiple UEs. The base station 804 may include the per UE priority in the scheduling information per field (e.g., UE1 priority=0, UE2 priority=1, UE3 priority=0). The base station 804 may indicate per UE downlink/uplink priority based on a bit associated with the per UE scheduling field. In examples, a downlink beam of the first UE 802a may not be compatible with (or should not be paired with) an uplink beam of the third UE 802c, as the base station 804 may not be able to support full-duplex transmissions and receptions in one or more downlink/uplink occasions or in a particular time window. The bit included in the DCI may resolve the conflict based on the priority of the downlink/uplink beams. The first UE 802a and the third UE 802c may follow predefined rules/protocols to resolve the conflict based on an indicated priority level of the UEs 802a-802c. The conflict may correspond to the beams not being able to be paired with each other.

In a first example, if the third UE 802c has uplink traffic with a higher priority than the downlink traffic of the first UE 802a, the first UE 802a may drop the corresponding downlink reception occasion, receive a reduced power reception from the base station 804 in downlink, or adjust a downlink beam of the first UE 802a based on the uplink traffic of the third UE 802c for full-duplex communication at the base station 804. Adaptions of the first UE 802a may be based on a predefined protocol or a configuration of the base station 804. The first UE 802a may drop the downlink reception, as the base station 804 may not communicate with the first UE 802a if the communication beams are no longer compatible with the full-duplex mode of the base station 804. Transmitting a downlink communication to the first UE 802a when the communication beams are no longer compatible with each other may cause interference for communications of the third UE 802c, which may be determined to have higher priority than communications of the first UE 802a. If self-interference at the base station 804 is large enough, uplink transmissions from the third UE 802*c* to the base station 804 may fail. Thus, the base station 804 may drop the downlink communication to the first UE 802*a*, such that the first UE 802*a* will not receive a communication during the time slot. Dropping the transmission, reducing the transmit power of the downlink beam, or changing the beam may be based on the per UE priority level. For example, if beams 5 and 6 become incompatible with each other, the beams may be switched to different beams, such as beams 7 and 8.

The base station 804 may reduce the transmit power of the downlink communication to the first UE 802*a*, if the first UE 802*a* is determined to be of lower priority than the third UE 802*c* from which the base station 804 is expecting an uplink transmission. The reduction in transmit power of the downlink communication to the first UE 802*a* may reduce the self-interference at the base station 804. That is, reducing the transmit power of the downlink communication from the base station 804 to the first UE 802*a* may generate less interference to uplink transmissions of the third UE 802*c*, such that the base station 804 may be able to successfully receive the uplink transmission from the third UE 802*c*.

In a second example, if the downlink reception of the first UE 802*a* has a higher priority than the uplink transmission of the third UE 802*c*, the third UE 802*c* may drop the uplink transmission, transmit the uplink transmission based on an increased power, or adjust the uplink beam on which the third UE 802*c* transmits the uplink transmission to the base station 804. The priority of the first UE 802*a* may be determined by the third UE 802*c* for dropping the uplink transmission to the base station 804. For example, the priority of the first UE 802*a* may be indicated to the third UE 802*c* by the base station 804. The indication to the third UE 802*c* may cause the third UE 802*c* to stop the uplink transmission. For instance, the base station 804 may determine that transmission beam 5 and receiving beam 6 have degraded and may indicate the incompatibility of beams 5 and 6 to third UE 802*c* for stopping the uplink transmission of the third UE 802*c*.

In cases where there is not enough time for the priority of the first UE 802*a* to be indicated to the third UE 802*c* by the base station 804 for stopping the uplink transmission of the third UE 802*c*, the base station 804 may turn off a receiver for the uplink transmission of the third UE 802*c*, as the base station 804 may determine that the uplink transmission is not going to be successfully received based on self-interference at the base station 804. Such techniques may not conserver power at the third UE 802*c*, as the third UE 802*c* is still going to transmit the uplink transmission, but power may be conserved at the base station 804 by turning off the receiver for the uplink transmission.

In a third example, the downlink traffic of the first UE 802*a* may have the same priority as the uplink traffic of the third UE 802*c*. In such cases, the first UE 802*a* and the third UE 802*c* may resolve an uplink/downlink communication conflict based on predefined protocols that indicate which UE is to drop their communication with the base station 804. For example, the predefined protocols may indicate that if the priorities are the same, the downlink reception is to be dropped. Alternatively, the predefined protocols may indicate that if the priorities are the same, the uplink transmission is to be dropped.

The downlink priority of a UE may be determined in addition to the uplink priority of the UE based on predefined priority protocols. In an example, the downlink priority of the UE may correspond to the per UE priority level. In another example, the downlink priority of the UE may be set so that the downlink priority is the same as the uplink priority. That is, the downlink priority of the UE may be linked to the corresponding uplink priority of the UE (e.g. the priority of downlink SPS may be the same as the priority of the uplink channel for SPS ACK/NACK).

The priority level of the UE may correspond to a predefined per UE level priority. For example, regardless of whether the UE is performing a downlink reception for an uplink transmission (not per downlink or uplink channel level), the priority level may correspond to the per UE priority across the scheduled UEs. The per UE priority may be linked or included in the scheduling field of the associated UE ID in the group common DCI for multi-UE scheduling. Thus, the per UE priority may not be based on per channel priority, as the same channel may be scheduled for the UE. For the third UE 802*c* that performs the uplink transmission, the priority may be 1. For the first UE 802*a* that performs the downlink reception, the priority may be 0. The priorities may be different per UE per channel or the priorities may be the same. For the third UE 802*c*, regardless of whether the third UE 802*c* is scheduled for downlink or uplink, the priority may be high (e.g., the priority may be 1). For the first UE 802*a*, regardless of whether the first UE 802*a* is scheduled for downlink or uplink, the priority may be low (e.g., the priority may be 0).

Figure 9:
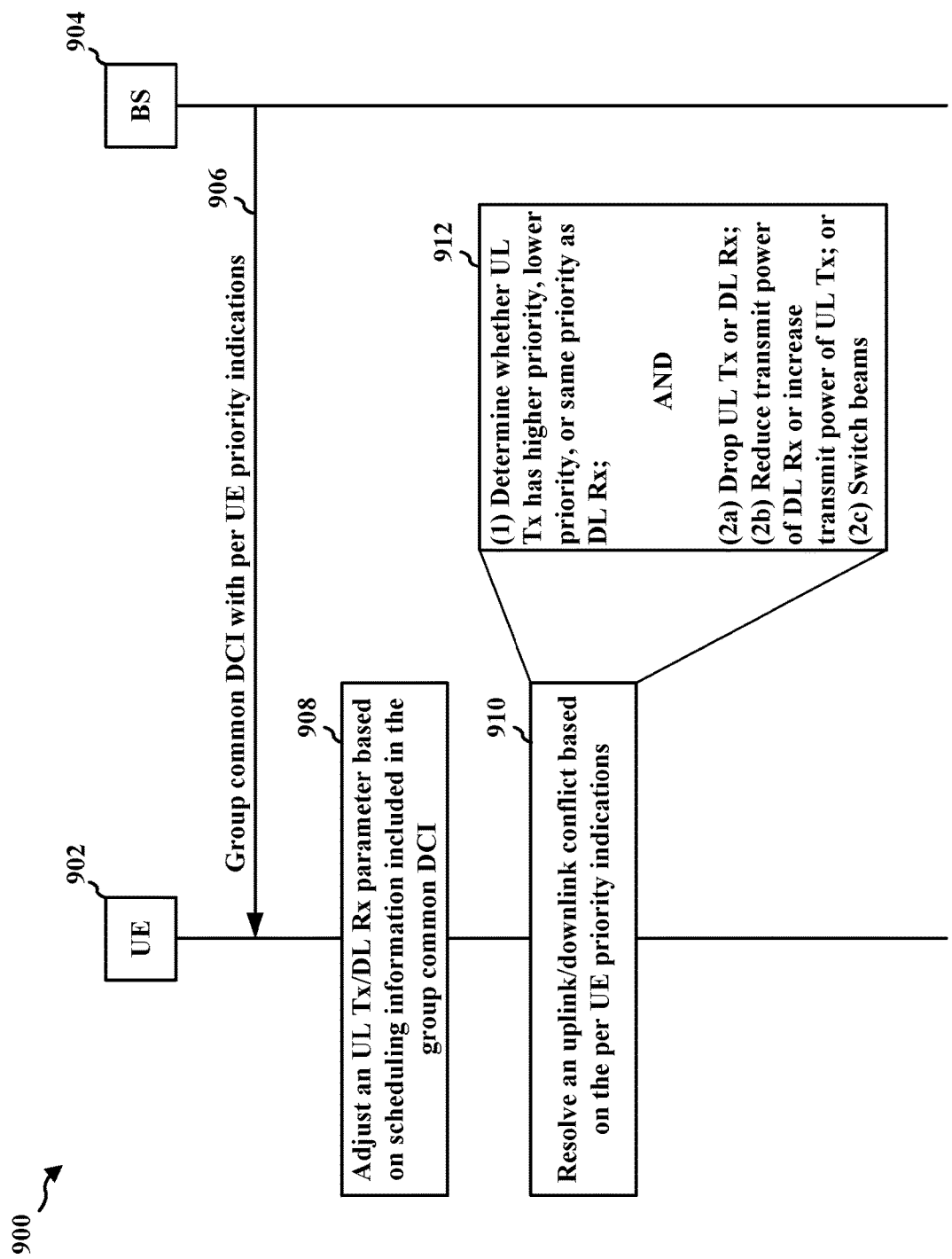
FIG. 9 is a call flow diagram illustrating communications between a UE and a base station.

FIG. 9 is a call flow diagram 900 illustrating communications between a UE 902 and a base station 904. At 906, the base station 904 may transmit group common DCI to the UE 902. The group common DCI may be configured to schedule each of a plurality of UEs for an uplink transmission or a downlink reception. The group common DCI may include per UE priority indications for each of the plurality of UEs. For example, the per UE priority indications may indicate a priority of an uplink transmission and a downlink reception of a respective UE, such as the UE 902.

At 908, the UE may adjust an uplink transmit parameter or a downlink receive parameter based on scheduling information included in the group common DCI received, at 906, from the base station 904. The adjustment to the parameter, at 908, may cause the UE 902 to perform a procedure, at 912, for resolving an uplink/downlink conflict between the UE 902 and a different UE included in the plurality of UEs.

At 910, the UE 902 may resolve the uplink/downlink conflict based on the per UE priority indications included in the group common DCI received, at 906, from the base station 904. To resolve the conflict, at 910, the UE 902 may determine, at 912(1) whether the uplink transmission has a higher priority, a lower priority, or the same priority as the downlink reception. If the uplink priority is determined, at 912(1), to be higher than the downlink priority, the UE 902 may drop, at 912(2*a*), the downlink reception, reduce, at 912(2*b*) a transmit power of the downlink reception, and/or switch, at 912(2*c*), a beam associated with the downlink reception to a different beam that is compatible with the uplink transmission in the full-duplex communication. If the downlink priority is determined, at 912(1), to be higher than the uplink priority, the UE 902 may alternatively drop, at 912(2*a*), the uplink transmission, increase, at 912(2*b*) a transmit power of the uplink transmission, and/or switch, at 912(2*c*) a beam associated with the uplink transmission to a different beam that is compatible with the downlink reception in the full-duplex communication. If the downlink priority is determined, at 912(1), to be the same as the uplink priority, the UE 902 may alternatively drop, at 912(2*a*), the downlink reception or the uplink transmission, reduce, at 912(2*b*), a transmit power of the downlink reception or increase, at 912(2*b*), a transmit power of the uplink transmission, and/or switch, at 912(2*c*), a beam associated with the downlink reception or the uplink transmission to a different beam that is compatible with an opposing direction of the full-duplex communication.

Figure 10:
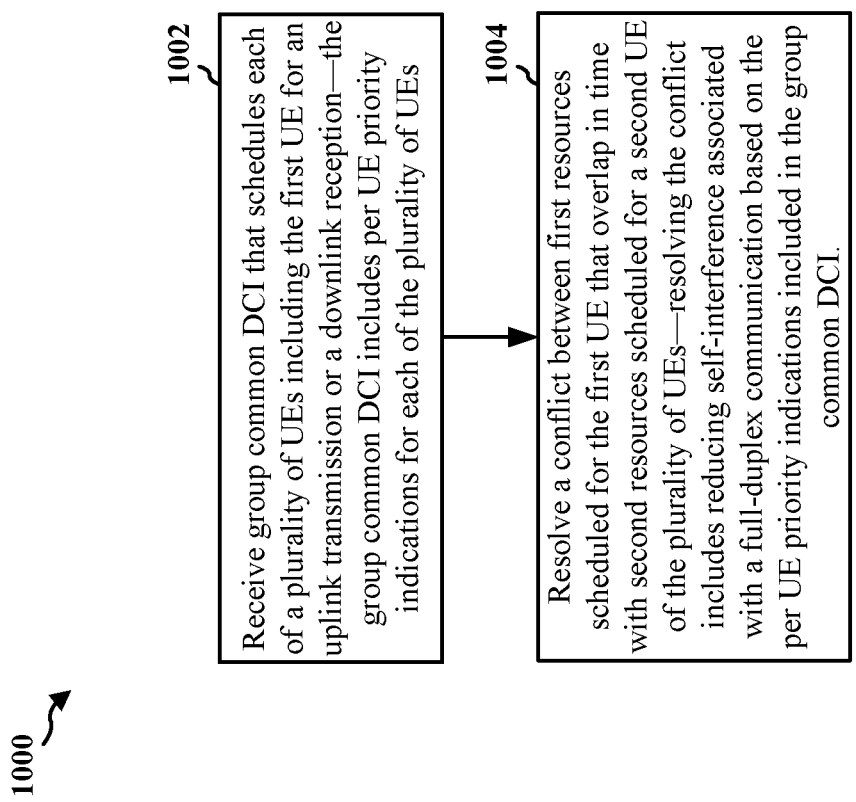
FIG. 10 is a flowchart of a method of wireless communication at a UE.

FIG. 10 is a flowchart 1000 of a method of wireless communication. The method may be performed by a UE (e.g., the UE 104, 404a-404c, 406a-406c, 802a-802c, 902; the apparatus 1302; etc.), which may include the memory 360 and which may be the entire UE 104, 404a-404c, 406a-406c, 802a-802c, 902 or a component of the UE 104, 404a-404c, 406a-406c, 802a-802c, 902, such as the TX processor 368, the RX processor 356, and/or the controller/processor 359. The method may be performed to reduce self-interference in full-duplex communications.

At 1002, the UE may receive group common DCI that schedules each of a plurality of UEs including the first UE for an uplink transmission or a downlink reception—the group common DCI includes per UE priority indications for each of the plurality of UEs. For example, referring to FIGS. 7-9, the UE 902 may receive, at 906, group common DCI with per UE priority indications from the base station 904. In the diagram 700, the group common DCI 702 may schedule SPS occasions 704a-704d for a first UE 802a and CG occasions 706a-706b/708a-708b for a second UE 802b and a third UE 802c. The reception, at 1002, may be performed by the reception component 1330 of the apparatus 1302 in FIG. 13.

At 1004, the UE may resolve a conflict between first resources scheduled for the first UE that overlap in time with second resources scheduled for a second UE of the plurality of UEs—resolving the conflict includes reducing self-interference associated with a full-duplex communication based on the per UE priority indications included in the group common DCI. For example, referring to FIG. 9, the UE 902 may resolve, at 910, an uplink/downlink conflict based on the per UE priority indications included in the group common DCI received, at 906, from the base station 904. The resolution, at 1004, may be performed by the resolution component 1342 of the apparatus 1302 in FIG. 13.

Figure 11:
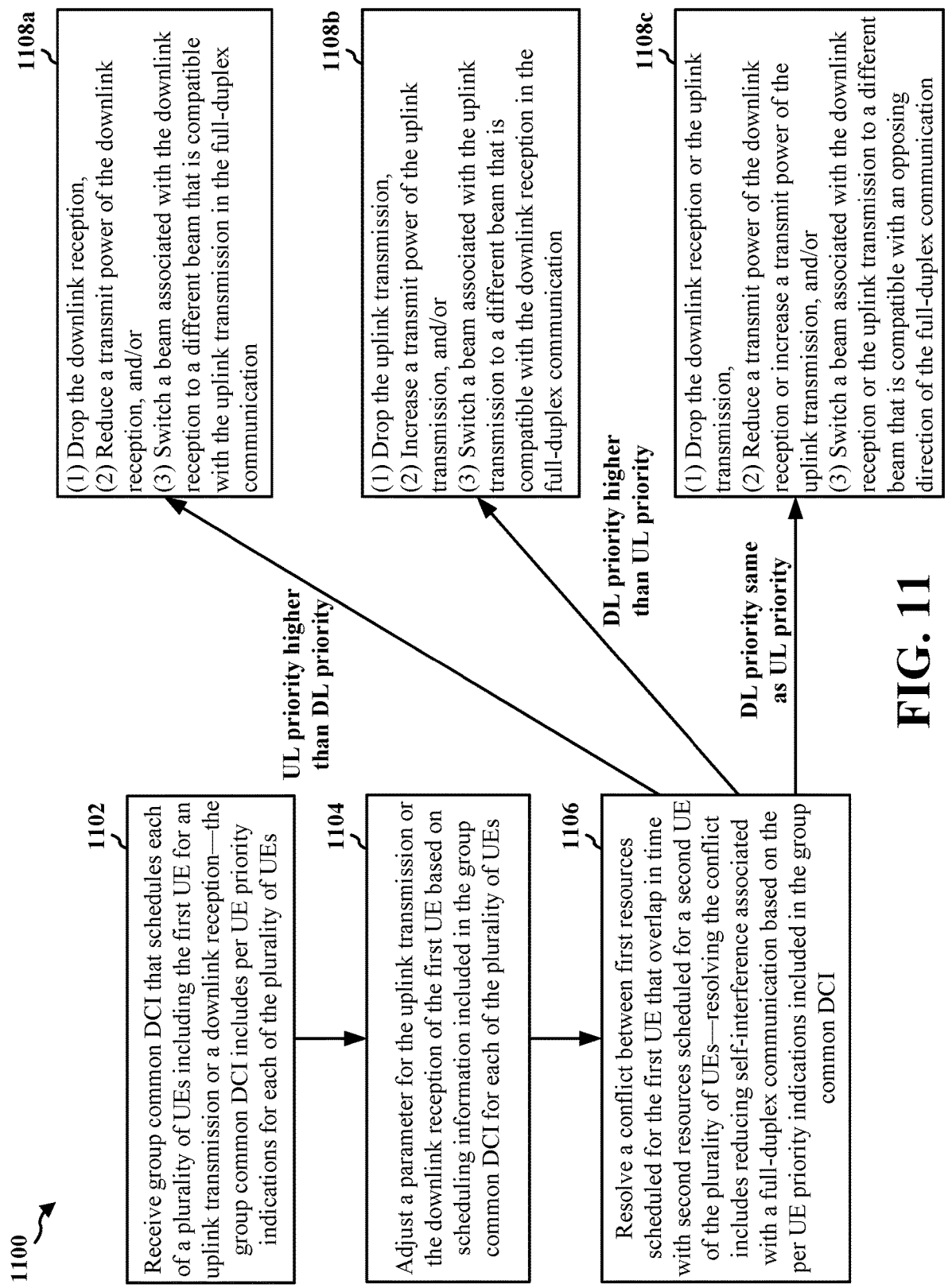
FIG. 11 is a flowchart of a method of wireless communication at a UE.

FIG. 11 is a flowchart 1100 of a method of wireless communication. The method may be performed by a UE (e.g., the UE 104, 404a-404c, 406a-406c, 802a-802c, 902; the apparatus 1302; etc.), which may include the memory 360 and which may be the entire UE 104, 404a-404c, 406a-406c, 802a-802c, 902 or a component of the UE 104, 404a-404c, 406a-406c, 802a-802c, 902, such as the TX processor 368, the RX processor 356, and/or the controller/processor 359. The method may be performed to reduce self-interference in full-duplex communications.

At 1102, the UE may receive group common DCI that schedules each of a plurality of UEs including the first UE for an uplink transmission or a downlink reception—the group common DCI includes per UE priority indications for each of the plurality of UEs. For example, referring to FIGS. 7-9, the UE 902 may receive, at 906, group common DCI with per UE priority indications from the base station 904. In the diagram 700, the group common DCI 702 may schedule SPS occasions 704a-704d for a first UE 802a and CG occasions 706a-706b/708a-708b for a second UE 802b and a third UE 802c. The reception, at 1102, may be performed by the reception component 1330 of the apparatus 1302 in FIG. 13.

The per UE priority indications received, at 906, in the group common DCI may be included in per UE scheduling fields associated with each of the plurality of UEs. The per UE scheduling fields may correspond to respective UE IDs associated with the plurality of UEs (e.g., UEs 802a-802c). The per UE priority indications may include at least one bit indicative of at least one of an uplink priority or a downlink priority for the plurality of UEs (e.g., UEs 802a-802c). The per UE priority indications may correspond to a downlink priority for one or more of the plurality of UEs (e.g., UEs 802a-802c). The per UE priority indications include a downlink priority for one or more of the plurality of UEs (e.g., UEs 802a-802c), where the downlink priority for the one or more of the plurality of UEs may correspond to an uplink priority for a respective UE. The per UE priority indications may be independent of whether the plurality of UEs (e.g., UEs 802a-802c) are scheduled for the uplink transmission or the downlink reception.

At 1104, the UE may adjust a parameter for the uplink transmission or the downlink reception of the first UE based on scheduling information included in the group common DCI for each of the plurality of UEs. For example, referring to FIG. 9, the UE 902 may adjust, at 908, an uplink transmit parameter or a downlink receive parameter based on scheduling information included in the group common DCI received, at 906, from the base station 904. The adjustment, at 1104, may be performed by the adjustment component 1340 of the apparatus 1302 in FIG. 13.

At 1106, the UE may resolve a conflict between first resources scheduled for the first UE that overlap in time with second resources scheduled for a second UE of the plurality of UEs—resolving the conflict includes reducing self-interference associated with a full-duplex communication based on the per UE priority indications included in the group common DCI. For example, referring to FIG. 9, the UE 902 may resolve, at 910, an uplink/downlink conflict based on the per UE priority indications included in the group common DCI received, at 906, from the base station 904. The resolution, at 1106, may be performed by the resolution component 1342 of the apparatus 1302 in FIG. 13.

At 1108a, if the uplink priority is higher than the downlink priority, the UE may (1) drop the downlink reception, (2) reduce a transmit power of the downlink reception, and/or (3) switch a beam associated with the downlink reception to a different beam that is compatible with the uplink transmission in the full-duplex communication. For example, referring to FIG. 9, the UE 902 may perform a procedure, at 912, to resolve the uplink/downlink conflict. For instance, the UE 902 may determine, at 912(1), that the uplink transmission has a higher priority than the downlink reception and may drop the downlink reception, at 912(2a), reduce the transmit power of the downlink reception, at 912(2b), or switch beams, at 912(2c). The resolution procedures (1)-(3) described in connection with 1108a may be performed by the resolution component 1342 of the apparatus 1302 in FIG. 13.

At 1108b, if the downlink priority is higher than the uplink priority, the UE may alternatively (1) drop the uplink transmission, (2) increase a transmit power of the uplink transmission, and/or (3) switch a beam associated with the uplink transmission to a different beam that is compatible with the downlink reception in the full-duplex communication. For example, referring to FIG. 9, the UE 902 may perform a procedure, at 912, to resolve the uplink/downlink conflict. For instance, the UE 902 may determine, at 912(1), that the downlink reception has a higher priority than the uplink transmission and may drop the uplink transmission, at 912(2a), increase the transmit power of the uplink transmission, at 912(2b), or switch beams, at 912(2c). The resolution procedures (1)-(3) described in connection with 1108b may be performed by the resolution component 1342 of the apparatus 1302 in FIG. 13.

At 1108c, if the downlink priority is the same as the uplink priority, the UE may alternatively (1) drop the uplink transmission, (2) increase a transmit power of the uplink transmission, and/or (3) switch a beam associated with the uplink transmission to a different beam that is compatible with the downlink reception in the full-duplex communication. For example, referring to FIG. 9, the UE 902 may perform a procedure, at 912, to resolve the uplink/downlink conflict. For instance, the UE 902 may determine, at 912(1), that the downlink reception has a same priority as the uplink transmission and may drop the downlink reception or the uplink transmission, at 912(2*a*), reduce a transmit power of the downlink reception or increase a transmit power of the uplink transmission, at 912(2*b*), or switch beams, at 912(2*c*). The resolution procedures (1)-(3) described in connection with 1108c may be performed by the resolution component 1342 of the apparatus 1302 in FIG. 13.

Figure 12:
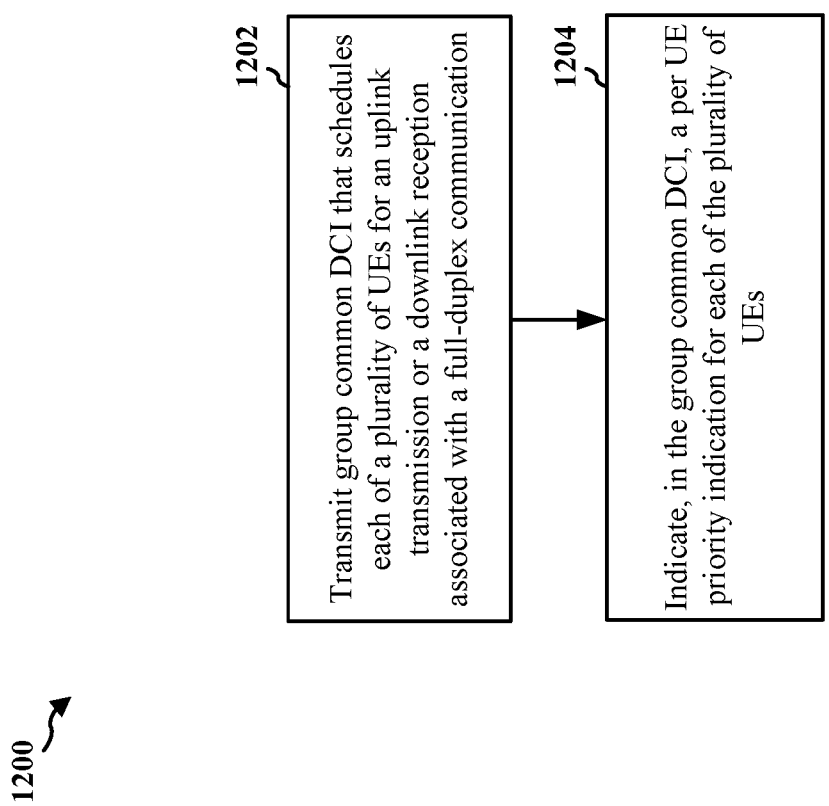
FIG. 12 is a flowchart of a method of wireless communication at a base station.

FIG. 12 is a flowchart 1200 of a method of wireless communication. The method may be performed by a base station (e.g., the base station 102, 402a-402c, 408a-408c, 804, 904; the apparatus 1402; etc.), which may include the memory 376 and which may be the entire base station 102, 402a-402c, 408a-408c, 804, 904 or a component of the base station 102, 402a-402c, 408a-408c, 804, 904, such as the TX processor 316, the RX processor 370, and/or the controller/processor 375. The method may be performed to reduce self-interference in full-duplex communications.

At 1202, the base station may transmit group common DCI that schedules each of a plurality of UEs for an uplink transmission or a downlink reception associated with a full-duplex communication. For example, referring to FIGS. 7-9, the base station 904 may transmit, at 906, group common DCI to the UE 902. The group common DCI 702 may schedule SPS occasions 704a-704d for a first UE 802a and CG occasions 706a-706b/708a-708b for a second UE 802b and a third UE 802c associated with a full-duplex base station 804. A parameter may be adjusted (e.g., at 908) for the uplink transmission or the downlink reception based on scheduling information included in the group common DCI 702 for the plurality of UEs (e.g., 802a-802c). The transmission, at 1202, may be performed by the transmission component 1434 of the apparatus 1402 in FIG. 14.

At 1204, the base station may indicate, in the group common DCI, a per UE priority indication for each of the plurality of UEs. For example, referring to FIG. 9, the base station 904 may indicate, at 906, per UE priority indications to the UE 902 in the group common DCI. The per UE priority indication, indicated at 906, may be included in per UE scheduling fields associated with each of the plurality of UEs (e.g., 802a-802c). The per UE scheduling field may correspond to respective UE IDs associated with the plurality of UEs (e.g., 802a-802c). The per UE priority indication, indicated at 906, may include at least one bit indicative of at least one of an uplink priority or a downlink priority for the plurality of UEs (e.g., 802a-802c). The per UE priority indications, indicated at 906, may correspond to a downlink priority for one or more of the plurality of UEs (e.g., 802a-802c). The per UE priority indications, indicated at 906, may include a downlink priority for one or more of the plurality of UEs (e.g., 802a-802c), where the downlink priority for the one or more of the plurality of UEs may correspond to an uplink priority for a respective UE. The per UE priority indications, indicated at 906, may be independent of whether the plurality of UEs are scheduled for the uplink transmission or the downlink reception. The indication, at 1204, may be performed by the indication component 1440 of the apparatus 1402 in FIG. 14.

Figure 13:
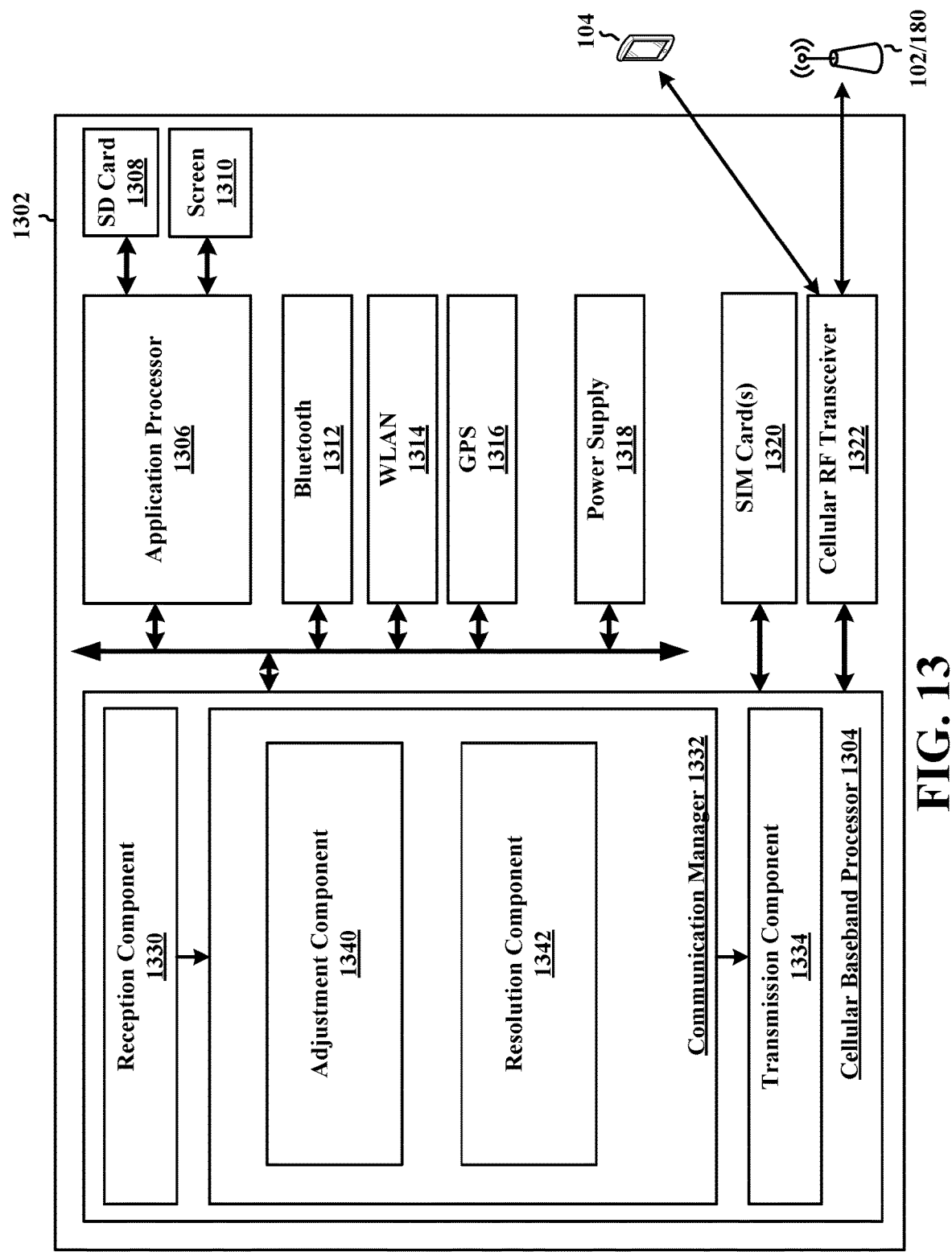
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory.

The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The reception component 1330 is configured, e.g., as described in connection with 1002 and 1102, to receive group common DCI that schedules each of a plurality of UEs including the first UE for an uplink transmission or a downlink reception—the group common DCI includes per UE priority indications for each of the plurality of UEs. The communication manager 1332 includes an adjustment component 1340 that is configured, e.g., as described in connection with 1104, to adjust a parameter for the uplink transmission or the downlink reception of the first UE based on scheduling information included in the group common DCI for each of the plurality of UEs. The communication manager 1332 further includes a resolution component 1342 that is configured, e.g., as described in connection with 1004 and 1106, to resolve a conflict between first resources scheduled for the first UE that overlap in time with second resources scheduled for a second UE of the plurality of UEs—resolving the conflict includes reducing self-interference associated with a full-duplex communication based on the per UE priority indications included in the group common DCI.

In a first example, where the second resources for the uplink transmission of the second UE have a higher priority than the first resources for the downlink reception of the first UE, the resolution component 1344 may be configured, e.g., as described in connection with 1108*a*, to drop the downlink reception, reduce a transmit power of the downlink reception, or switch a beam associated with the downlink reception to a different beam that is compatible with the uplink transmission in the full-duplex communication. In a second example, where the second resources for the downlink reception of the second UE have a higher priority than the first resources for the uplink transmission of the first UE, the resolution component 1344 may be configured, e.g., as described in connection with 1108*b*, to drop the uplink transmission, increase a transmit power of the uplink transmission, or switch a beam associated with the uplink transmission to a different beam that is compatible with the downlink reception in the full-duplex communication. In a third example, where the downlink reception has a same priority as the uplink transmission, the resolution component 1344 may be configured, e.g., as described in connection with 1108*c*, to drop the downlink reception or the uplink transmission, reduce a transmit power of the downlink reception or increase a transmit power of the uplink transmission, and/or switch a beam associated with the downlink reception or the uplink transmission to a different beam that is compatible with an opposing direction of the full-duplex communication.

The apparatus may include additional components that perform each of the blocks of the algorithm in the flowcharts of FIGS. 10-11. As such, each block in the flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving group common DCI that schedules each of a plurality of UEs including the first UE for an uplink transmission or a downlink reception, the group common DCI including per UE priority indications for each of the plurality of UEs; and means for resolving a conflict between first resources scheduled for the first UE that overlap in time with second resources scheduled for a second UE of the plurality of UEs, wherein resolving the conflict includes reducing self-interference associated with a full-duplex communication based on the per UE priority indications included in the group common DCI. The apparatus 1302 further includes means for adjusting a parameter for the uplink transmission or the downlink reception of the first UE based on scheduling information included in the group common DCI for each of the plurality of UEs.

If the conflict is associated with the second resources for the uplink transmission of the second UE having a higher priority than the first resources for the downlink reception of the first UE, and the means for resolving the conflict may be further configured to at least one of: drop the downlink reception, reduce a transmit power of the downlink reception, or switch a beam associated with the downlink reception to a different beam that is compatible with the uplink transmission in the full-duplex communication. If the conflict is associated with the second resources for the downlink reception of the second UE having a higher priority than the first resources for the uplink transmission of the first UE, the means for resolving the conflict may be further configured to at least one of: drop the uplink transmission, increase a transmit power of the uplink transmission, or switch a beam associated with the uplink transmission to a different beam that is compatible with the downlink reception in the full-duplex communication. If the conflict is associated with the downlink reception having a same priority as the uplink transmission, the means for resolving the conflict may be further configured to at least one of: drop the downlink reception or the uplink transmission, reduce a first transmit power of the downlink reception or increase a second transmit power of the uplink transmission, or switch a beam associated with the downlink reception or the uplink transmission, the beam being compatible with an opposing direction of the full-duplex communication.

The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
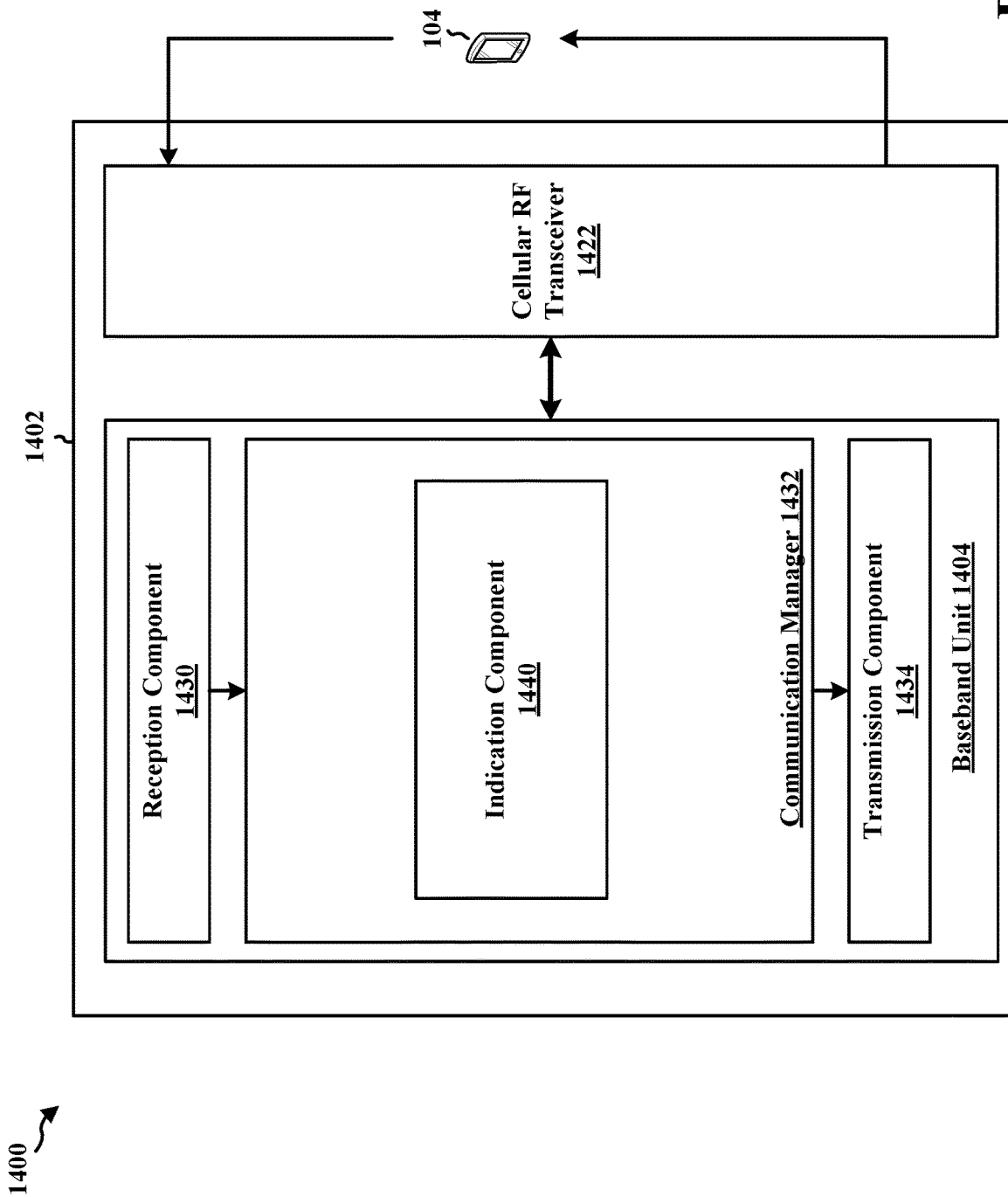
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1302 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes an indication component 1440 that is configured, e.g., as described in connection with 1204, to indicate, in the group common DCI, a per UE priority indication for each of the plurality of UEs. The transmission component 1434 is configured, e.g., as described in connection with 1202, to transmit group common DCI that schedules each of a plurality of UEs for an uplink transmission or a downlink reception associated with a full-duplex communication.

The apparatus may include additional components that perform each of the blocks of the algorithm in the flowchart of FIG. 12. As such, each block in the flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for transmitting group common DCI that schedules each of a plurality of UEs for an uplink transmission or a downlink reception associated with a full-duplex communication; and means for indicating, in the group common DCI, a per UE priority indication for each of the plurality of UEs.

The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and configured to receive group common DCI that schedules each of a plurality of UEs including the first UE for an uplink transmission or a downlink reception, the group common DCI including per UE priority indications for each of the plurality of UEs; and resolve a conflict between first resources scheduled for the first UE that overlap in time with second resources scheduled for a second UE of the plurality of UEs, wherein resolving the conflict includes reducing self-interference associated with a full-duplex communication based on the per UE priority indications included in the group common DCI.

Aspect 2 may be combined with aspect 1 and includes that the per UE priority indications are included in per UE scheduling fields associated with each of the plurality of UEs.

Aspect 3 may be combined with any of aspects 1-2 and includes that the per UE scheduling fields correspond to respective UE IDs associated with the plurality of UEs.

Aspect 4 may be combined with any of aspects 1-3 and includes that the at least one processor is further configured to adjust a parameter for the uplink transmission or the downlink reception of the first UE based on scheduling information included in the group common DCI for each of the plurality of UEs.

Aspect 5 may be combined with any of aspects 1-4 and includes that the per UE priority indications include at least one bit indicative of at least one of an uplink priority or a downlink priority for the plurality of UEs.

Aspect 6 may be combined with any of aspects 1-5 and includes that the conflict is associated with the second resources for the uplink transmission of the second UE having a higher priority than the first resources for the downlink reception of the first UE, and wherein resolving the conflict includes at least one of: dropping the downlink reception, reducing a transmit power of the downlink reception, or switching a beam associated with the downlink reception to a different beam that is compatible with the uplink transmission in the full-duplex communication.

Aspect 7 may be combined with any of aspects 1-5 and includes that the conflict is associated with the second resources for the downlink reception of the second UE having a higher priority than the first resources for the uplink transmission of the first UE, and wherein resolving the conflict includes at least one of: dropping the uplink transmission, increasing a transmit power of the uplink transmission, or switching a beam associated with the uplink transmission to a different beam that is compatible with the downlink reception in the full-duplex communication.

Aspect 8 may be combined with any of aspects 1-5 and includes that the conflict is associated with the downlink reception having a same priority as the uplink transmission, and wherein resolving the conflict includes at least one of: dropping the downlink reception or the uplink transmission, reducing a first transmit power of the downlink reception or increasing a second transmit power of the uplink transmission, or switching a beam associated with the downlink reception or the uplink transmission, the beam being compatible with an opposing direction of the full-duplex communication.

Aspect 9 may be combined with any of aspects 1-8 and includes that the per UE priority indications correspond to a downlink priority for one or more of the plurality of UEs.

Aspect 10 may be combined with any of aspects 1-9 and includes that the per UE priority indications include a downlink priority for one or more of the plurality of UEs, the downlink priority for the one or more of the plurality of UEs corresponding to an uplink priority for a respective UE.

Aspect 11 may be combined with any of aspects 1-10 and includes that the per UE priority indications are independent of whether the plurality of UEs are scheduled for the uplink transmission or the downlink reception.

Aspect 12 may be combined with any of aspects 1-11 and further includes at least one of an antenna or a transceiver coupled to the at least one processor.

Aspect 13 is an apparatus for wireless communication at a base station including at least one processor coupled to a memory and configured to: transmit group common DCI that schedules each of a plurality of UEs for an uplink transmission or a downlink reception associated with a full-duplex communication; and indicate, in the group common DCI, a per UE priority indication for each of the plurality of UEs.

Aspect 14 may be combined with aspect 13 and includes that the per UE priority indication is included in per UE scheduling fields associated with each of the plurality of UEs.

Aspect 15 may be combined with any of aspects 13-14 and includes that the per UE scheduling field corresponds to respective UE IDs associated with the plurality of UEs.

Aspect 16 may be combined with any of aspects 13-15 and includes that a parameter is adjusted for the uplink transmission or the downlink reception based on scheduling information included in the group common DCI for the plurality of UEs.

Aspect 17 may be combined with any of aspects 13-16 and includes that the per UE priority indication includes at least one bit indicative of at least one of an uplink priority or a downlink priority for the plurality of UEs.

Aspect 18 may be combined with any of aspects 13-17 and includes that the per UE priority indications correspond to a downlink priority for one or more of the plurality of UEs.

Aspect 19 may be combined with any of aspects 13-18 and includes that the per UE priority indications include a downlink priority for one or more of the plurality of UEs, the downlink priority for the one or more of the plurality of UEs corresponding to an uplink priority for a respective UE.

Aspect 20 may be combined with any of aspects 13-19 and includes that the per UE priority indications are independent of whether the plurality of UEs are scheduled for the uplink transmission or the downlink reception.

Aspect 21 may be combined with any of aspects 13-20 and further includes at least one of an antenna or a transceiver coupled to the at least one processor.

Aspect 22 is a method of wireless communication for implementing any of aspects 1-21.

Aspect 23 is an apparatus for wireless communication including means for implementing any of aspects 1-21.

Aspect 24 is a computer-readable medium storing computer executable code, the code when executed by at least one processor causes the at least one processor to implement any of aspects 1-21.

What is claimed is:

1. An apparatus for wireless communication at a first user equipment (UE), comprising:
 a memory; and
 at least one processor coupled to the memory and configured to:
  receive group common downlink control information (DCI) that schedules each of a plurality of UEs including the first UE for an uplink transmission or a downlink reception, the group common DCI including per UE priority indications for each of the plurality of UEs; and
  resolve a conflict between first resources scheduled for the first UE that overlap in time with second resources scheduled for a second UE of the plurality of UEs, wherein resolving the conflict includes reducing self-interference associated with a full-duplex communication based on the per UE priority indications included in the group common DCI.

2. The apparatus of claim 1, wherein the per UE priority indications are included in per UE scheduling fields associated with each of the plurality of UEs.

3. The apparatus of claim 2, wherein the per UE scheduling fields correspond to respective UE identifiers (IDs) associated with the plurality of UEs.

4. The apparatus of claim 1, wherein the at least one processor is further configured to adjust a parameter for the uplink transmission or the downlink reception of the first UE based on scheduling information included in the group common DCI for each of the plurality of UEs.

5. The apparatus of claim 1, wherein the per UE priority indications include at least one bit indicative of at least one of an uplink priority or a downlink priority for the plurality of UEs.

6. The apparatus of claim 1, wherein the conflict is associated with the second resources for the uplink transmission of the second UE having a higher priority than the first resources for the downlink reception of the first UE, and wherein resolving the conflict includes at least one of:
 dropping the downlink reception,
 reducing a transmit power of the downlink reception, or
 switching a beam associated with the downlink reception to a different beam that is compatible with the uplink transmission in the full-duplex communication.

7. The apparatus of claim 1, wherein the conflict is associated with the second resources for the downlink reception of the second UE having a higher priority than the first resources for the uplink transmission of the first UE, and wherein resolving the conflict includes at least one of:
 dropping the uplink transmission,
 increasing a transmit power of the uplink transmission, or
 switching a beam associated with the uplink transmission to a different beam that is compatible with the downlink reception in the full-duplex communication.

8. The apparatus of claim 1, wherein the conflict is associated with the downlink reception having a same priority as the uplink transmission, and wherein resolving the conflict includes at least one of:
- dropping the downlink reception or the uplink transmission,
- reducing a first transmit power of the downlink reception or increasing a second transmit power of the uplink transmission, or
- switching a beam associated with the downlink reception or the uplink transmission, the beam being compatible with an opposing direction of the full-duplex communication.

9. The apparatus of claim 1, wherein the per UE priority indications correspond to a downlink priority for one or more of the plurality of UEs.

10. The apparatus of claim 1, wherein the per UE priority indications include a downlink priority for one or more of the plurality of UEs, the downlink priority for the one or more of the plurality of UEs corresponding to an uplink priority for a respective UE.

11. The apparatus of claim 1, wherein the per UE priority indications are independent of whether the plurality of UEs are scheduled for the uplink transmission or the downlink reception.

12. The apparatus of claim 1, further comprising at least one of an antenna or a transceiver coupled to the at least one processor.

13. A method of wireless communication at a first user equipment (UE), comprising:
- receiving group common downlink control information (DCI) that schedules each of a plurality of UEs including the first UE for an uplink transmission or a downlink reception, the group common DCI including per UE priority indications for each of the plurality of UEs; and
- resolving a conflict between first resources scheduled for the first UE that overlap in time with second resources scheduled for a second UE of the plurality of UEs, wherein resolving the conflict includes reducing self-interference associated with a full-duplex communication based on the per UE priority indications included in the group common DCI.

14. The method of claim 13, wherein the per UE priority indications are included in per UE scheduling fields associated with each of the plurality of UEs.

15. The method of claim 14, wherein the per UE scheduling fields correspond to respective UE identifiers (IDs) associated with the plurality of UEs.

16. The method of claim 13, further comprising adjusting a parameter for the uplink transmission or the downlink reception of the first UE based on scheduling information included in the group common DCI for each of the plurality of UEs.

17. The method of claim 13, wherein the per UE priority indications include at least one bit indicative of at least one of an uplink priority or a downlink priority for the plurality of UEs.

18. The method of claim 13, wherein the conflict is associated with the second resources for the uplink transmission of the second UE having a higher priority than the first resources for the downlink reception of the first UE, and wherein resolving the conflict includes at least one of:
- dropping the downlink reception,
- reducing a transmit power of the downlink reception, or
- switching a beam associated with the downlink reception to a different beam that is compatible with the uplink transmission in the full-duplex communication.

19. The method of claim 13, wherein the conflict is associated with the second resources for the downlink reception of the second UE having a higher priority than the first resources for the uplink transmission of the first UE, and wherein resolving the conflict includes at least one of:
- dropping the uplink transmission,
- increasing a transmit power of the uplink transmission, or
- switching a beam associated with the uplink transmission to a different beam that is compatible with the downlink reception in the full-duplex communication.

20. The method of claim 13, wherein the conflict is associated with the downlink reception having a same priority as the uplink transmission, and wherein resolving the conflict includes at least one of:
- dropping the downlink reception or the uplink transmission,
- reducing a first transmit power of the downlink reception or increasing a second transmit power of the uplink transmission, or
- switching a beam associated with the downlink reception or the uplink transmission, the beam being compatible with an opposing direction of the full-duplex communication.

* * * * *